United States Patent [19]

Gritter

[11] 4,041,368

[45] Aug. 9, 1977

[54] THREE-PHASE, QUASI-SQUARE WAVE VSCF INDUCTION GENERATOR SYSTEM

[75] Inventor: David James Gritter, Elmhurst, Ill.

[73] Assignee: Borg-Warner Corporation, Chicago, Ill.

[21] Appl. No.: 646,230

[22] Filed: Jan. 2, 1976

[51] Int. Cl.² .............................................. H02P 9/30
[52] U.S. Cl. ..................................... 322/47; 318/231; 363/157
[58] Field of Search ............... 321/69 R, 61; 318/171, 318/231; 322/47

[56] References Cited

U.S. PATENT DOCUMENTS

| | | | |
|---|---|---|---|
| 3,148,323 | 9/1964 | Blake et al. | 321/69 R |
| 3,170,107 | 2/1965 | Jessee | 321/69 R |
| 3,372,323 | 3/1968 | Guyeska | 318/231 |
| 3,585,489 | 6/1971 | Pelly et al. | 321/69 |
| 3,832,624 | 8/1974 | Gilmore et al. | 321/69 R |

*Primary Examiner*—William H. Beha, Jr.
*Attorney, Agent, or Firm*—James J. Jennings, Jr.

[57] ABSTRACT

A plural switch matrix is connected as a direct ac-to-dc converter between an induction generator and an a-c load. The generator provides three-phase output energy which is switched and controlled by the converter, to supply a controlled three-phase quasi-square wave (QSW) voltage to a load. The converter switching provides periodic shorts across the generator terminals, translating some of the mechanical input energy into electrical energy to sustain the generator field. The converter is regulated by gating signals from a combinational logic circuit.

11 Claims, 10 Drawing Figures

VSCF System
(Prior Art)

QSW LINE-TO-LINE VOLTAGE

THREE-PHASE, QUASI-SQUARE WAVE VSCF INDUCTION GENERATOR SYSTEM

BACKGROUND OF THE INVENTION

Recently considerable work has been directed to the operation of an induction machine as a self-excited generator. U.S. Pat. No. 3,829,758, entitled "AC-DC Generating System", which issued to the assignee of this application on August 13, 1974, teaches the use of an inverter-type circuit for exciting the generator. Since that time it has been found that the generator field can be modulated to provide a constant frequency a-c system. Such an arrangement is described and claimed in the application entitled "Modulated Induction Generator", filed Apr. 16, 1975, having Ser. No. 568,746, now U.S. Pat. No. 3,958,174 and is assigned to the assignee of this application. A subsequent step in the evolution of this technology was the provision of a controlled switching arrangement for both shorting the generator terminals to provide excitation for the induction generator field and periodically reversing the polarity of the voltage supplied to the load terminals, to provide a square wave alternating voltage from the same inverter-type circuit which excites the generator. This step is described and claimed in the application entitled "Variable Speed, Constant Frequency Induction Generator System", filed Nov. 28, 1975, Ser. No. 636,331, which issued as U.S. Pat. No. 3,982,170 on Sept. 21, 1976, and is assigned to the assignee of this application. This last-filed application pointed out that a generator having an unusual winding configuration, such as a plurality of closely-wound windings for each phase circuit, would be required to provide a constant-frequency, or controlled-frequency, quasi-square wave a-c voltage to energize a multi-phase load.

It is therefore a principal object of this invention to provide a switching system for both intermittently shorting the generator terminals to excite an induction generator and also to provide a constant (or controlld) frequency, quasisquare wave, three-phase a-c output voltage to a load, using only a conventional three-phase induction generator operating over a wide speed range.

A related and important object of this invention is to provide such a switching arrangement which is capable of full regeneration, and requires no large energy storage devices.

A corollary consideration of this invention is to provide such a power conversion system in which the frequency of the output voltage is independent of the generator frequency, and in fact may be either higher or lower than the frequency of the induction generator.

Another important object of the invention is to provide a nine-switch converter useful in direct ac-to-acpower conversion systems.

Still another important object of the invention is the provision of a power conversion system which receives a general quasi-square wave voltage at a given frequency, and converts it to another quasi-wave voltage at a different frequency.

SUMMARY OF THE INVENTION

A power conversion system constructed according to this invention has a converter, comprising nine power switches connected in a matrix such that the power switches can be closed in different combinations to supply different output potentials. Also included in a control means, coupled to the converter, for regulating turn-on and turn-off of the nine power switches to determine the output potentials.

In one embodiment the system of the invention includes three system input connections suitable for coupling to the output terminals of a three-phase induction generator, and also has three system output connections for providing three-phase quasi-square wave a-c energy to supply any suitable a-c load. The control means includes a combinational logic circuit with nine gates. Each gate has an output connection for applying a turn-on signal to one of the nine converter power switches, and each gate has two input connections. Also included is a first counter circuit, having three output connections, each of which is coupled to three different gate input connections in the combinational logic circuit. Likewise there is a second counter circuit, having three output connections, each of which is coupled to three different gate input connections in the combinational logic circuit. Some means, such as one or more oscillators, is coupled to both the first and second counter circuits, for supplying timing pulses to both counter circuits to regulate operation of the power switches and thus correspondingly regulate the frequency of the input QSW voltage (which controls the amplitude of the output voltage), and also regulate the frequency of the quasi-square wave, three-phase a-c output voltage.

THE DRAWINGS

In the several figures of the drawings, like reference numerals identify like components, and in those drawings.

GENERAL BACKGROUND DESCRIPTION

Figure 1:
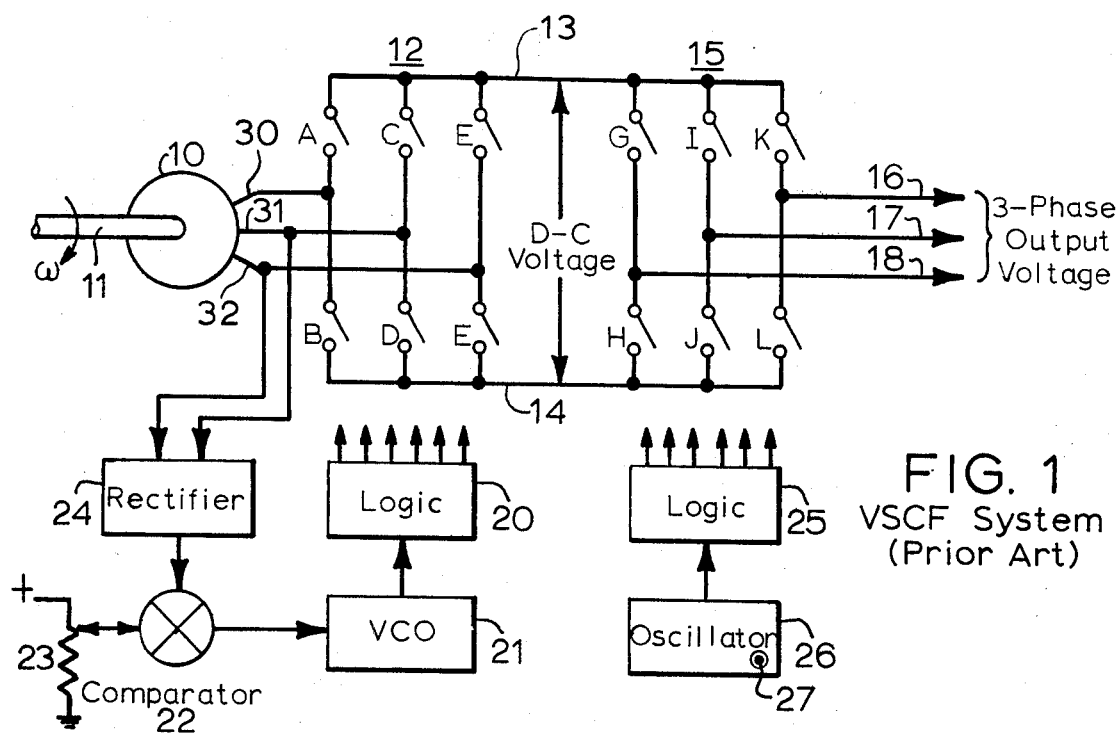
FIG. 1 is a schematic diagram depicting a prior art variable speed, constant frequency generating system.

One system for providing a constant frequency a-c output voltage from a generator 10 driven over a shaft 11 at some variable frequency ω is shown in FIG. 1, providing three-phase energy at its output connections 30, 31, and 32. Such arrangements are generally termed VSCF (variable speed, constant frequency) systems. As there shown, an inverter-type circuit 12 comprising switches A-F is coupled to d-c bus conductors 13, 14. This inverter-type circuit not only supplies the field excitation for the generator 10 but also feeds d-c power to the bus conductors 13, 14, as taught in U.S. Pat. No. 3,829,758. A second inverter circuit 15, with switches G-L, is energized from the d-c power on bus conductors 13, 14, providing a controlled-frequency, three-phase output voltage on the output conductors 16, 17, and 18.

The first inverter 12 has the switches A-F controlled by a logic circuit 20, in turn regulated by a voltage-controlled oscillator (VCO) 21 which supplies timing pulses at a frequency determined by an input error signal supplied by a comparator 22. The comparator receives both a reference signal from a reference unit 23, which can be any suitable unit such as a potentiometer, and a feedback signal from a rectifier circuit 24 coupled to the output connections of the induction generator 10. Of course the feedback signal could also be derived from the bus conductors 13, 14 to obviate the need for a rectifier circuit. This arrangement, including components 20–23, forces the inverter 12 switching frequency to follow the induction machine speed very closely, as described in the above-identified patent. The power switches G-L in the second inverter circuit 15 are governed by a separate logic circuit 25, driven from a second oscillator 26. Knob 27 represents a means for adjusting the frequency of the timing signals supplied by oscillator 26 to the logic circuit 25. Thus the frequency of the output voltage on conductors 16–18 is independent of the speed of rotation of the generator 10 and of the switching frequency of the first inverter-type cicuit 12.

After considerable analysis of the system shown in FIG. 1 it was discovered that it is possible to provide a matrix of power switches to effect an ac-to-ac transformation without the intermediate step of providing the d-c voltage on the bus 13, 14. Two conditions must be met to effect the transformation in the same manner as the two-inverter system of FIG. 1: (1) the input terminals must be selectively connected to the appropriate ones of the output terminals to provide the desired output potentials; and (2) the correct input terminals must be connected to each other, and the proper output terminals must be connected to each other, in the proper sequence. The basic generator excitation depends upon the periodic shorting of the generator terminals, as described in the above identified application having Serial No. 636,331. These conditions can be met, making all the proper connections between all the terminals 16–18 and 30–32, using only nine power switches (such as P1–P9 in FIG. 2) instead of the 12 switches shown in FIG. 1. In general the term "converter", as used herein and in the appended claims, refers to a plurality of power switches connected in a matrix such that, with given potentials appearing on the input connections 30, 31 and 32, closure of the power switches in different combinations in effect applies different potentials, depending on the switches closed in a given combination, on the output conductors 16–18.

Figure 1A:
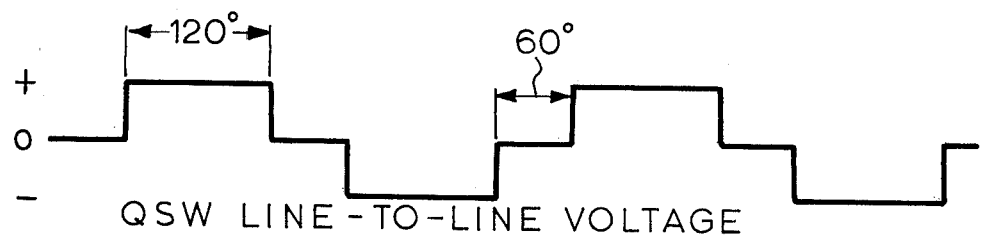
FIG. 1A is a graphical illustration of a QSW line-to-line voltage.

To avoid confusion as to what is meant by a quasi-square wave voltage waveform, FIG. 1A depicts a QSW line-to-line voltage. This could, by way of example, be the voltage viewed between output conductors 16 and 17 in FIG. 1. It is apparent that the line-to-line potential is positive for a 120° time interval, zero (terminals shorted) for the next 60° interval, negative for the next 120° interval, shorted for the next 60°, and so forth. It will become apparent from the subsequent explanation of the invention that the power converter must not only translate the appropriate potentials between the input connections and output connections of the complete system, but must also provide the short circuits between the proper terminals at the appropriate times to produce the QSW output voltage.

Figure 3:
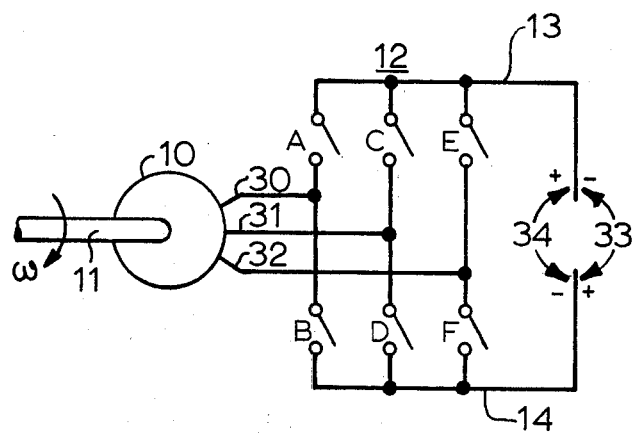

Another way of viewing a VSCF system is to consider the single phase arrangement shown in FIG. 3. Again the inverter-type circuit 12 is used to excite an induction generator by periodically closing the power switches A-F to produce quasi-square wave a-c energy at the generator output conductors 30–32, and a d-c voltage is produced on the bus conductors 13, 14. Considering a certain time when the switches A, D and F are closed and a potential represented by the polarity signs 33 is being provided, if A, D and F are suddenly opened and at the same time switches B, C, and E are closed, the inverter has been "turned up-side down" or "inverted" in an electrical sense. That is, the polarity of the voltage on the bus conductors is reversed, and is now represented by the polarity symbols 34. Thus by controlling the rate at which the inverter is itself "inverted", the frequency of the output voltage on the bus conductors can be controlled in the manner taught in the application having Ser. No. 636,331, filed Nov. 28, 1975.

In the system of Fig. 3 it is evident that the output is a square wave voltage, because the bus conductors cannot be shorted to produce a QSW voltage without shorting the generator terminals as well. It is desirable to utilize a QSW voltage waveform because of the harmonic content, as contrasted to other possible waveforms, and because the system is capable of handling a certain amount of reactive energy as a result of the circulation paths provided. Ordinary inverter switches, such as a thyristor in parallel with a diode, are not suitable for use as the switches A-F. Instead a switch which blocks current in both directions when open, and which passes current in both directions when turned on, is required. Such a switch, termed a "power switch" in this specification and in the appended claims, could be a pair of inverse-connected power transistors. If a thyristor is used as a power switch, then a commutation circuit must be provided, as is well known and understood in the art.

GENERAL DESCRIPTION OF THE INVENTION

Figure 4:
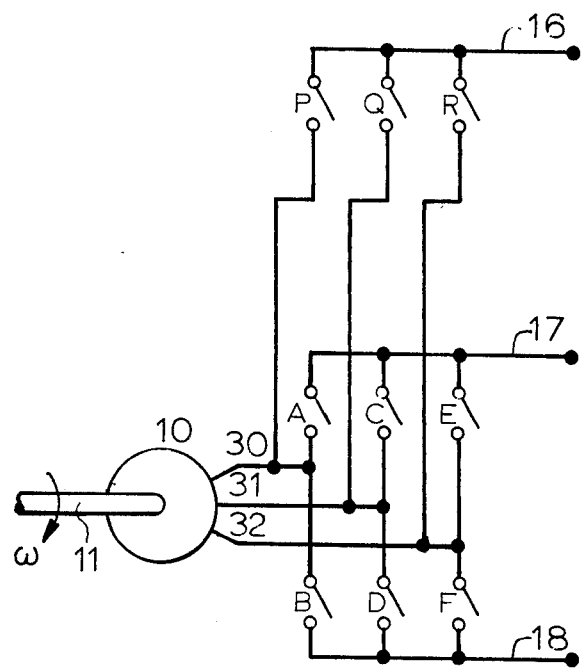

FIG. 4 shows that by adding another output terminal and three additional switches P, Q, and R to the system of FIG. 3, a three-phase output voltage can be supplied on lines 16, 17 and 18. The additional switches allow the shorting of any two output terminals, to obtain a quasi-square wave output voltage, since the input terminls which are not to be shorted need not now be directly connected to the shorted output terminals.

In an ordinary inverter-drive system, the output terminals are periodically connected to either the positive or negative d-c bus. Gating signals from a logic circuit, such as a ring counter, determine which bus conductor should be connected to which terminal, and further determine which terminals should be shorted to sustain the generator field. For an explanation of the present system, it is helpful to assume that the power conversion system of this invention has an imaginary d-c bus, and two separate logic or ring counter circuits. The first logic circuit would normally connect the generator output terminals (or converter input terminals) to the imaginary bus, in a matter analogous to the connection of the output terminals 30–32 of generator 10 in FIG. 1 to the real bus 13, 14, and in so doing would provide the terminal to-terminal shorts to sustain the generator field. The second ring counter can be used to govern the connections of the system output terminals, such as conductors 16–18 in FIG. 1, to the imaginary bus. It will become apparent that an important component of the present invention is a combinational logic circuit which compares (1) the desired connections of the system input connections to the imaginary bus to (2) the desired connections between the system output terminals and the imaginary bus, closing only those a-c power switches between the terminals whose "bus" connections coincide.

Figure 6:
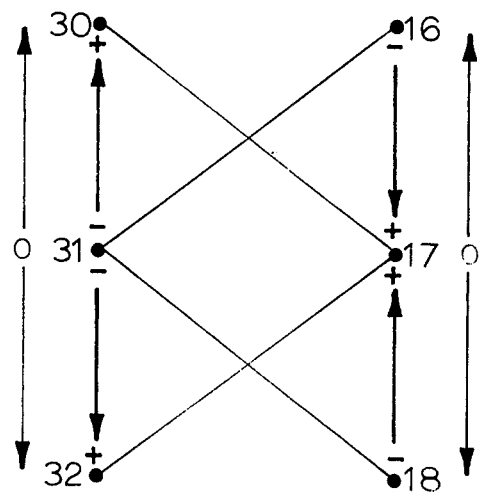
FIGS. 5 and 6 are vector diagrams, useful in understanding the present invention.
Figure 5:
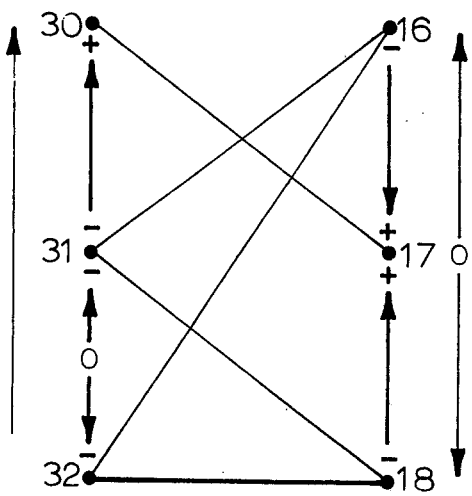

FIGS. 5 and 6 show the generator output terminals 30, 31 and 32 and the load terminals 16, 17 and 18 of FIG. 4, without the converter power switches. FIG. 5 indicates the polarities at some instant in time when the potential on terminal 30 is positive with respect to the potentials at both terminals 31 and 32, which are then shorted together. Similarly the potential at output terminal 17 is positive with respect to the potentials then present at both terminals 16 and 18. To provide these output voltage polarities, the system power switches would connect terminal 30 to terminal 17 (A in FIG. 4 is closed), terminal 31 to terminals 16 and 18 (Q and D closed), and terminal 32 to terminals 16 and 18 (R and F closed), thus providing not only the appropriate input to output connections, but also the required short circuits (16 to 18 and 31 to 32). During the next polarity change of the generator, terminals 30 and 32 are positive with respect to terminal 31 as shown in FIg. 6, and it is assumed that the output voltage polarities on terminals 16–18 remain as they were in FIG. 5. FIG. 6 illustrates the new switch connections which would be required at this time. From the foregoing it is apparent that this is realized by closing the switches A, Q, D and E in FIG. 4. Those skilled in the art will not readily understand the switching sequence which must be implemented to effect the direct ac-to-ac power conversion without any solid d-c bus conductors such as used in the circuit of Fig. 1.

DETAILED DESCRIPTION OF THE INVENTION

Figure 7:
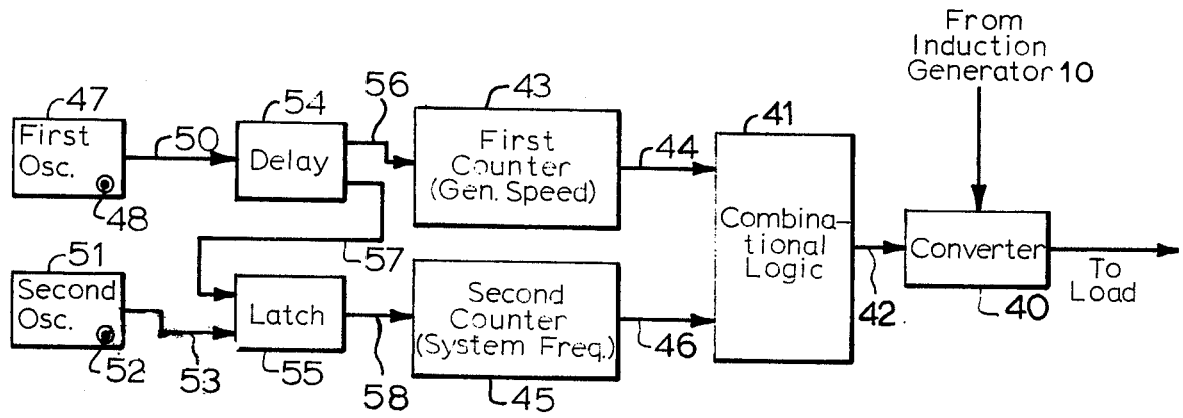
FIG. 7 is a block diagram of major components of the present invention.

The block diagram of FIG. 7 depicts salient components of the power conversion system of this invention. As there shown, a converter 40 provides the requisite switching between an induction generator 10 and the load to be supplied by a three-phase, quasi-square wave output voltage. Converter 40 may comprise nine switches such as those designated generally P1-P9 in FIG. 2. The combinational logic circuit 41 in FIG. 7 provides output signals over line 42 to regulate the converter operation to provide the requisite energy to the load when the induction generator is operating. Combinational logic circuit 41 provides the signals which close the switches P1-P9 to effect the desired circuit connections as described above in connection with FIGS. 5 and 6. To this end the combinational logic circuit receives a first series of control signals from a first counter 43, which in effect regulates the generator frequency by those signals passed over line 44 to the combinational logic circuit. Signals from the second counter 45 are passed over line 46 to the combinational logic circuit, and these signals in effect determine the frequency of the output voltage passed by the converter over the output conductors such as 16, 17 and 18 in Fig. 1 to any suitable a-c load.

The control signals provided by first counter 43 are in turn determined by timing signals issued by a first oscillator circuit 47, and the frequency of these timing signals is determined by some adjusting means, represented by adjustable know 48. The output or timing signals from oscillator 47 are provided on line 50. The second oscillator 51 also includes some means designated 52 for adjusting the frequency of the timing signls provided on its output line 53. Those skilled in the art will appreciate that the output signals on lines 50, 53 could be applied directly to the counters 43, 45 or the timing signals could be provided by a single oscillator and passed over different circuits, one of which may include division and/or multiplication stages to supply the requisite timing signals. However in the preferred embodiment the separate oscillators were provided as shown, and a delay circuit 54 was coupled between the first oscillator and the first counter. In addition a latch circuit 55 was provided and connected as shown. That is, the delayed output signals from circuit 54 were provided over a first line 56 to a first counter 43. The signals on line 57, delayed longer than those on line 56, are then applied to the other input connection of latch circuit 55. The output signal from the latch circuit is passed over line 58 to the second counter 45. Those skilled in the art will recognize that the use of the longer delay and the latch circuit is one approach to preventing switching failure in the power switches which might otherwise be caused by the virtually simultaneous arrival of timing pulses on the lines 44 and 46. This will be better understood in connection with the more detailed showing in FIG. 8. For the present it is important to note that the converter, combinational logic circuit, and the first and second counter circuits are important components of the invention. The additional blocks representing the first and second oscillators, together with the delay and latch circuits, can together be considered as means for supplying timing pulses to both the counter circuits 43 and 45, thus to regulate the generator speed (hence output voltage amplitude) and the actual frequency of the quasi-square wave a-c output voltage.

The nine-switch converter is important in itself, as it can provide ac-to-ac power conversion at controlled frequency and regulated amplitude. Broadly then the other components (41, 43, 45, 47, 51, 54 and 55) can be collectively considered as a control means for regulating the turn-on and turn-off of the nine power switches in the converter.

Figure 8:
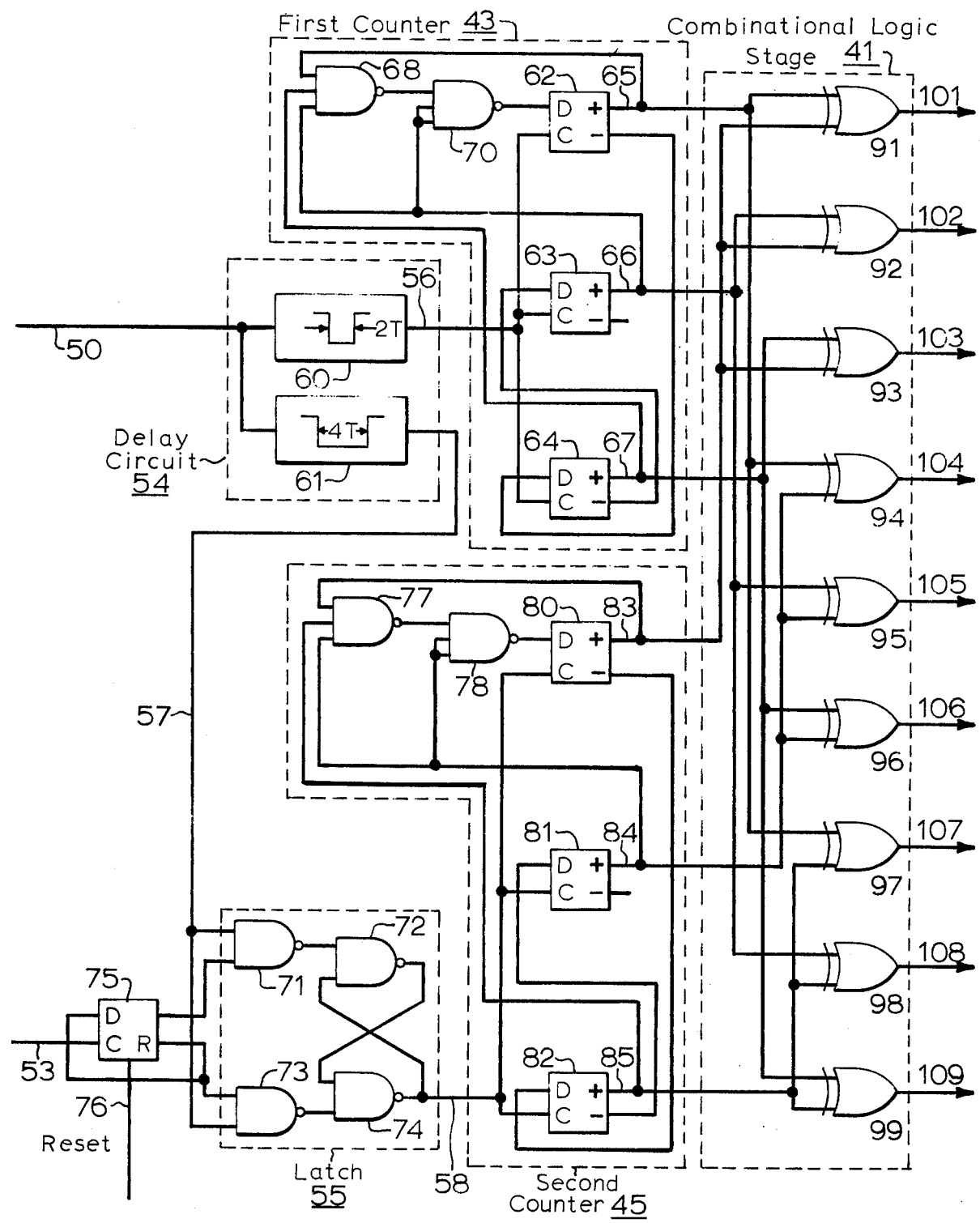
FIG. 8 is a schematic diagram depicting certain components shown in FIG. 7 in greater detail.

FIG. 8 illustrates the details of the counter and combinational logic circuits. As there shown, timing signals provided by the first oscillator are received over line 50 and applied to both stages 60 and 61 within delay circuit 54. It is assumed that the power switches in converter 40 have a turn-off time T. Hence stage 60 provides a delay of twice that turn-off time, or 2T, and delay stage 61 provides a substantially longer delay, 4T. These delays insure that a power switch has sufficient time to turn off and completely recover before it is turned on again.

The output signal from stage 60 in delay circuit 54 is passed over line 56 to the input of first counter 43. This counter is a conventional logic or ring counter circuit, including three flip-flop stages 62, 63 and 64 connected to provide output signals on the conductors 65, 66 and 67 as a function of the basic timing signals received over line 50 from the first oscillator. In addition counter 43 includes NAND stages 68, 70 connected to provide proper starting of the first counter 43.

The longer-delayed signals from stage 61 within delay circuit 54 are passed over conductor 57 to the input side of latch circuit 55, which includes the conventionally connected logic stages 71, 72, 73 and 74. The other input signal for latch 55 is provided from the second oscillator over line 53, and a divide-by-two circuit 75 is interposed between the second oscillator and the latch circuit 55. This was done for convenience to provide the appropirate frequency of the signals to the latch circuit. A reset signal can be applied over line 76 to the divide-by-two circuit 75 when the system is started. The output signal from latch circuit 55 is passed over conductor 58 to the input side of second counter 45. As shown this is another conventional ring counter circuit, with a pair of NAND stages 77, 78 to provide for proper starting and three flip-flops 80, 81 and 82 connected to provide the sequential output signals on lines 83, 84 and 85 as a function of the timing signals received over line 58.

Figure 2:
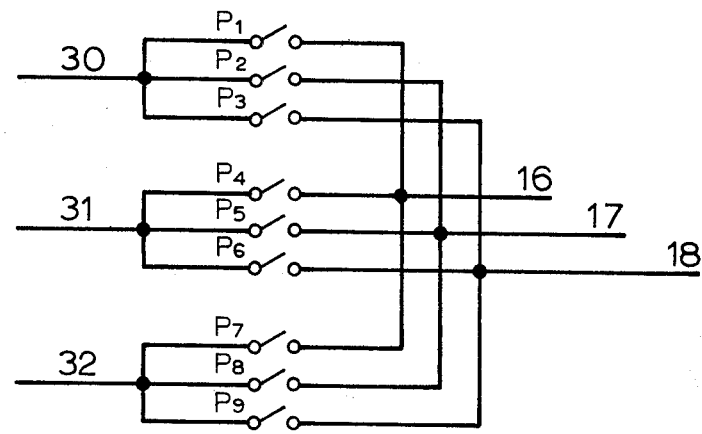
FIGS. 2, 3 and 4 are simplified schematic showings.

The signals from the first and second counters are applied to the input connections of the exclusive OR gates 91–99 in the combinational logic stage 41 as shown in FIG. 8. This provides the appropriate combination of turn-on signals on the output conductors 101–109 for application to the nine power switches (connected as shown in FIG. 2) within converter 40. Those skilled in the art will understand that the power switches can, by way of example, be comprised of nine inverseparallel pairs of power transistors, which would not require any commutation or turn-off signal. If other units such as a triac or inverse-parallel thyristors are employed, then of course suitable commutation circuits must be supplied for turn-off in a manner well known and understood by those skilled in the art.

Figure 9:
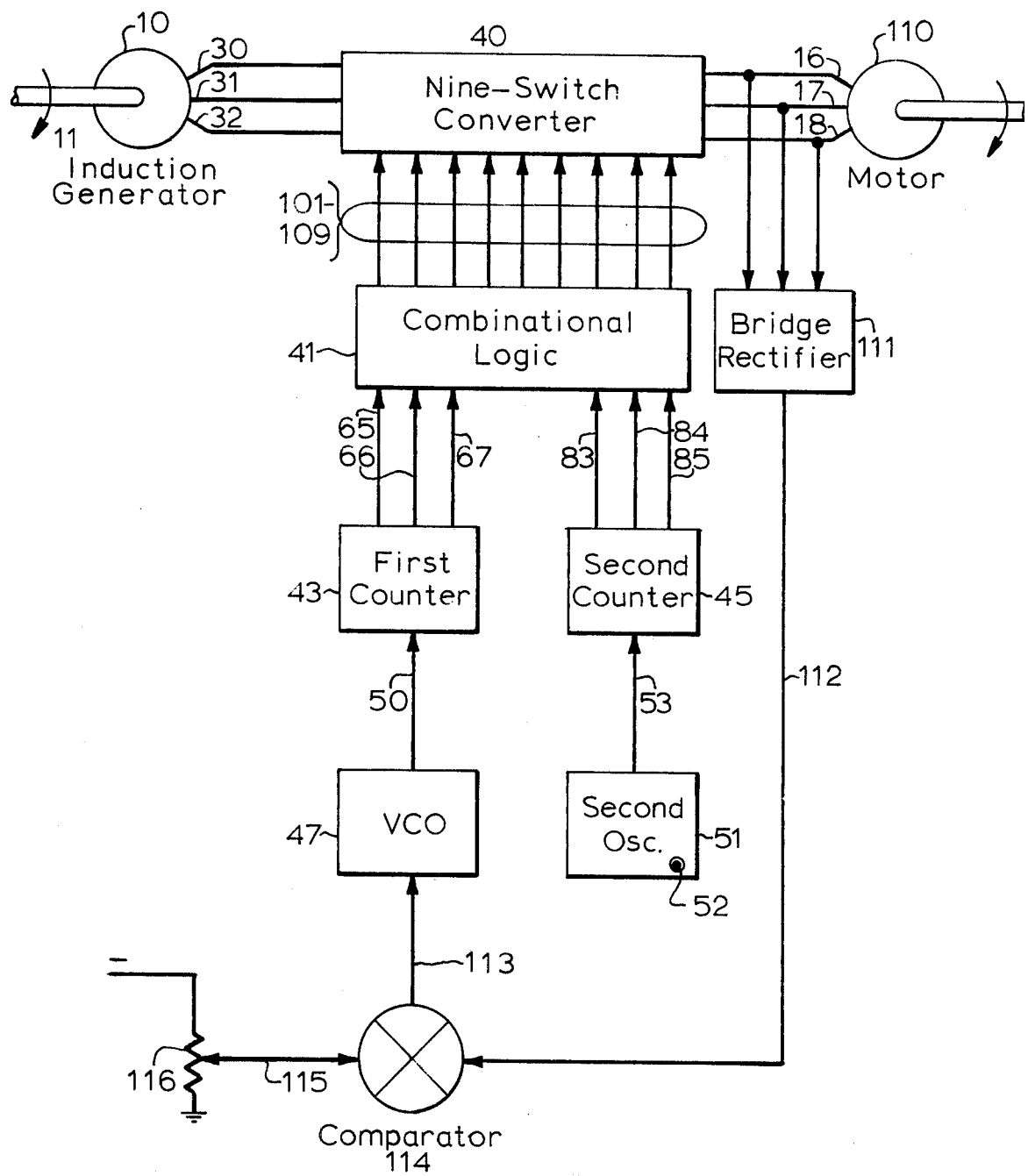
FIG. 9 is a system block diagram depicting an actual system connected and tested to prove the principles of the present invention.

FIG. 9 is a block arrangement showing an actual system which was built and successfully operated to prove the principles on which the invention is based. A nine-switch converter 40 was utilized, with nine switches such as those designated P1–P9 shown in FIG. 2 connected between the system input and output connections. Induction generator 10 was a two horsepower unit and in one test arrangement, the load 110 was a two horse power induction motor. The delay and latch circuits are omitted from the showing of FIG. 9 for simplicity. In the test arrangement a bridge rectifier 111 was connected as shown to provide a signal on line 112 related to the amplitude of the three-phase output voltage provided to the load. Instead of the first oscillator 47 being a simple unit with a self-contained adjustment, the first oscillator was a voltage controlled oscillator (VCO) as shown, and received its controlling voltage input signal over line 113 from a comparator 114. The other input signal to the comparator was a reference signal provided over line 115. The comparator algebraically summed the rectified signal on line 112 with the reference voltage signal on line 115 provided by a reference unit 116, such as a potentiometer. Such arrangements are well known and understood for providing an output signal on line 113 which governs the operation of VCO 47. With this arrangement the two horsepower motor 110 was successfully and easily run over a frequency range from 30 hertz to 120 hertz. It was found that if the frequency of the output voltage supplied to the motor was very close to the input frequency supplied by the induction generator, or to a subharmonic of the input frequency, there was a noticeable torque pulsation of the induction motor 110 at the beat (difference) frequency. When the inertia of motor 110 was small, this pulsation was sufficiently severe to cause speed variations in excess of the normal slip range. The effect was most severe and objectionable when the output frequency was close to the input frequency, but was not noticed at higher speed ratios.

It is understood that some excitation must be supplied for the induction generator during system start-up. As taught in the above-identified patent, this can be done with a simple low-voltage battery connected to supply a small d-c potential during the initial energization of the induction generator. Alternatively the remanent magnetization of the rotor can be used, or some other supply used to "dump" a small amount of energy into the system at the time of starting.

TECHNICAL ADVANTAGES

A three-phase, quasi-square wave generating system has been explained. The frequency of the output voltage on conductors 16–18 can be regulated independently of the generator frequency, simply by regulating the frequency of the timing pulses supplied by the second oscillator. The system is capable of supplying a resistive load up to the rating of the induction generator, and can supply inductive loads of considerably greater magnitude. The simple switching system of the converter can use nine power switches, or force-commutated switches in a manner well known and understood by those skilled in this art.

It is important to note that the nine-switch converter 40 has significant utility in addition to its use with induction generator systems. For example, it can be used with any ac-to-ac conversion system, in lieu of known two-inverter systems (FIG. 1) or Cycloconverters and other similar arrangements. It is also important to note that the control means which regulates the converter is not limited to produce only a quasi-square wave output voltage. Instead pulse-width modulation techniques, which are well known and understood in this art, can be employed to control the waveform of the system output voltage.

In the appended claims the term "connected" means a d-c connection between two components with virtually zero d-c resistance between those components. The term "coupled" indicates there is a functional relationship between two components, withthe possible interposition of other elements between the two components described as coupled or "intercoupled."

While only a particular embodiment of the invention has been described and claimed herein, it is apparent that various modifications and alterations may be made therein. It is therefore the intention in the appended claims to cover all such modifications and alterations as may fall within the true spirit and scope of the invention.

What is claimed is:

1. An ac-to-ac power conversion system having three system input connections for receiving three-phase a-c energy from an induction generator having an electric field sustained by periodic shorting of the generator terminals, and three system output connections for providing three-phase a-c energy, comprising:
    a converter, comprising nine power switches connected in a matrix between the system input connections and the system output connections such that the power switches can be closed in different combinations to effectively regulate the periodic shorting of the generator terminals and to apply different potentials to the system output connections; and
    control means, coupled to the converter, for regulating turn-on and turn-off of the nine power switches to both regulate the shorting of the generator terminals and to determine the potentials applied to the system output connections.

2. An ac-to-ac power conversion system as claimed in claim 1, and in which said control means further comprises means for regulating the frequency of the three-phase a-c energy provided at the system input connections.

3. An ac-to-ac power conversion system as claimed in claim 1, and in which said control means further comprises means for regulating the frequency of the three-phase a-c energy provided at the system output connections.

4. An ac-to-ac power conversion system as claimed in claim 1, and in which said control means comprises a combinational logic circuit having an output circuit connected to supply individual turn-on signals to each of the nine power switches in the converter and also having an input circuit, a first counter circuit coupled to the input circuit of the combinational logic circuit to provide timing pulses for regulating the frequency of the three-phase a-c converter input energy, and a second counter circuit, also coupled to the input circuit of the combinational logic circuit, to provide timing pulses for regulating the frequency of the three-phase a-c output energy.

5. An ac-to-ac power conversion system as claimed in claim 4, and in which said control means further comprises frequency-adjusting means respectively coupled to both the first and second counter circuits, to provide an adjustment in the frequency of the timing pulses supplied to the combinational logic circuit and thus effect a corresponding regulation of the amplitude and frequency of the three-phase a-c output energy.

6. A power conversion system having three system input connections for receiving a three-phase a-c voltage from an induction generator having an electric field sustained by periodic shorting of the generator terminals, and three system output connections for providing a three-phase a-c output voltage, comprising:
a converter, including nine power switches connected in a matrix between the system input connections and the system output connections such that closure of the power switches in different combinations effectively regulates the shorting of the generator terminals and applies different potentials to the system output connections with a given set of potentials applied to the system input connections;
a combinational logic circuit with nine gates, each gate having an output connection for applying a turn-on signal to one of the nine power switches in the converter, and each gate having a pair of input connections; and
means, including a plurality of conductors for selectively applying control signals to the individual input connections of the combinational logic circuit, such that the control signals are effective to switch the gates in the combinational logic circuit to regulate the shorting of the generator terminals and control the frequency and the amplitude of the three-phase a-c voltage provided at the system output connections.

7. An ac-to-ac power conversion system as claimed in claim 6, and in which said means includes first and second counter circuits, each having output connections individually coupled to the gate input connections of the combinational logic circuit, such that operation of the counter circuits is effective to regulate closure of the converter power switches in different combinations.

8. An ac-to-ac power conversion system as claimed in claim 7, and in which said means further comprises additional means, coupled to both the first and the second counter circuits, for supplying timing pulses to regulate operation of both counter circuits and thus regulate the closure of the converter power switches.

9. A power conversion system having three system input connections for coupling to the output terminals of a three-phase induction generator having its electric field sustained responsive to periodic shorting across said output terminals, and three system output connections for providing three-phase quasi-square wave a-c energy, comprising:
a converter, including nine power switches connected in a matrix between the system input connections and the system output connections such that, with given potentials present at the system input connections, closure of the power switches in different combinations effectively applies different potentials to the system output connections, and such closure additionally short-circuits different pairs of the induction generator output terminals to sustain the generator field;
a combinational logic circuit with nine gates, each gate having an output connection for applying a turn-on signal to one of the nine power switches in the converter, and each gate having a pair of input connections;
a first counter circuit, having three output connections, each of which is coupled to three different gate input connections in the combinational logic circuit;
a second counter circuit, having three output connections, each of which is coupled to three different gate input connections in the combinational logic circuit; and
means, coupled to both the first and second counter circuits, for supplying timing pulses to both the counter circuits, thus regulating operation of the converter power switches to correspondingly regulate short-circuiting of the induction generator output terminals and control the amplitude and the frequency of the quasi-square wave output voltage.

10. A power conversion system as claimed in claim 9, and in which the means for supplying the timing pulses to both the counter circuits includes a first oscillator, coupled to the first counter circuit, and a second oscillator, coupled to the second counter circuit, such that the frequency of operation of the respective oscillators correspondingly regulates the provision of the timing pulses to the counter circuits.

11. A power conversion system as claimed in claim 10, and in which said first oscillator is regulated by an error signal, which system further comprises a comparator having an output circuit for supplying said error signal to the first oscillator, a first input circuit receiving a reference signal, and a second input circuit for receiving a feedback signal which varies as a function of the amplitude of the system a-c output voltage, with the error signal thus being used to maintain the system output voltage amplitude at a level set by the reference signal supplied to the comparator.

* * * * *